US009980153B1

(12) United States Patent
Osborn et al.

(10) Patent No.: US 9,980,153 B1
(45) Date of Patent: *May 22, 2018

(54) METHOD AND APPARATUS OF SUPPORTING WIRELESS FEMTOCELL CLUSTERS

(71) Applicant: OPEN INVENTION NETWORK LLC, Durham, NC (US)

(72) Inventors: Christopher Martin Edward Osborn, Allen, TX (US); Seong Ju Seo, Allen, TX (US); Kyungsik Choi, Plano, TX (US)

(73) Assignee: Open Invention Network, LLC, Durham, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/284,191

(22) Filed: Oct. 3, 2016

Related U.S. Application Data

(63) Continuation of application No. 14/691,779, filed on Apr. 21, 2015, now Pat. No. 9,462,480, which is a continuation of application No. 13/012,918, filed on Jan. 25, 2011, now Pat. No. 9,019,942.

(60) Provisional application No. 61/374,017, filed on Aug. 16, 2010.

(51) Int. Cl.
| | |
|---|---|
| H04W 4/00 | (2018.01) |
| H04W 16/18 | (2009.01) |
| H04W 84/04 | (2009.01) |
| H04W 8/26 | (2009.01) |

(52) U.S. Cl.
CPC .............. *H04W 16/18* (2013.01); *H04W 8/26* (2013.01); *H04W 84/045* (2013.01)

(58) Field of Classification Search
CPC ...................................................... H04W 4/06
USPC ....................................................... 370/338
See application file for complete search history.

*Primary Examiner* — Shripal Khajuria
(74) *Attorney, Agent, or Firm* — Haynes and Boone, LLP

(57) ABSTRACT

A method of operating a femtocell network cluster is disclosed. One example method of operating the femtocell network cluster may include certain operations, such as, selecting a master femtocell access point among various femtocell access points operating on the femtocell network cluster and updating a master table to include the master femtocell access point in the master table neighbor list. Other operations may include transmitting the master table to each of the femtocell access points informing them of the identity of the master femtocell access point. The tables may be maintained by all of the femtocell access points operating on the network.

20 Claims, 13 Drawing Sheets

FIG. 2 CLUSTER CREATION

ADDITION TO CLUSTER

REMOVAL FROM CLUSTER

CHANGE CLUSTER MASTER

FIG. 6 CHANGE CLUSTER MASTER IP ADDRESS

FIG. 7   CHANGE CLUSTER MEMBER IP ADDRESS

CLUSTER MASTER
REGISTRATION REJECTION

MASTER UNREACHABLE/
COMMUNICATION DOWN

HANDOFF FAIL

METHOD AND APPARATUS OF SUPPORTING WIRELESS FEMTOCELL CLUSTERS

CROSS REFERENCE TO RELATED APPLICATIONS

The present patent application is a continuation of and claims the benefit of U.S. patent application Ser. No. 14/691,779, filed on Apr. 21, 2015, entitled METHOD AND APPARATUS OF SUPPORTING WIRELESS FEMTOCELL CLUSTERS, issued as U.S. Pat. No. 9,462,480 on Oct. 4, 2016, which is a continuation of U.S. patent application Ser. No. 13/012,918, filed on Jan. 25, 2011, entitled METHOD AND APPARATUS OF SUPPORTING WIRELESS FEMTOCELL CLUSTERS, issued as U.S. Pat. No. 9,019,942 on Apr. 28, 2015, which is a non-provisional of provisional application 61/374,017, entitled "Femto Cell Cluster", filed on Aug. 16, 2010, the entire contents of which are hereby incorporated by reference.

TECHNICAL FIELD OF THE INVENTION

This invention relates to a method and apparatus of establishing a femtocell cluster, and, more particularly to establishing and maintaining communications among one ore more femtocell access points (FAPs).

BACKGROUND OF THE INVENTION

Communication network systems are commonly deployed over a wide geographic area. Femtocells may be deployed to provide licensed spectrum cellular systems within tightly constrained geographic areas. Femtocells normally cover a space as small as a room within a building, a small home and/or a business location. Femtocells are typically designed to provide service areas of 100-1000 square meters, while macrocells normally cover areas on the order of 10-100 square kilometers, and microcells cover 1-10 square kilometers, and picocells cover 10,000-100,000 square meters.

Femtocell network deployments are not significantly structured or preplanned. Rather, these networks often comprise a plurality of ad-hoc femtocell deployments. The simple femtocell configuration allows the femtocell networks to adapt to meet the requirements of many different deployment environments. For example, some networks might scale to one million femtocells, any of which might enter or leave the network at any time.

Communication signaling between mobile stations (MSs) and femtocell access point (FAPs) may include various techniques to ensure the MS is properly registered with the femtocell and is in communication with an appropriate FAP. Neighbor cells and clusters may be used to organize a femtocell communication environment. Registering a MS with a femtocell cluster of FAPs may require pre-planning and neighbor list sharing to ensure optimized network communications.

SUMMARY OF THE INVENTION

One example embodiment of the present invention may include a method of operating a femtocell network cluster. The method may include selecting a master femtocell access point among a plurality of femtocell access points operating on the femtocell network cluster. The method may also include updating a master table to include the master femtocell access point in the master table neighbor list, and transmitting the master table to each of the plurality of femtocell access points informing them of the identity of the master femtocell access point.

Another example embodiment of the present invention may include an apparatus configured to operate a femtocell network cluster. The apparatus may include a processor configured to select a master femtocell access point among a plurality of femtocell access points operating on the femtocell network cluster, and to update a master table to include the master femtocell access point in the master table neighbor list. The apparatus may also include a transmitter configured to transmit the master table to each of the plurality of femtocell access points informing them of the identity of the master femtocell access point.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
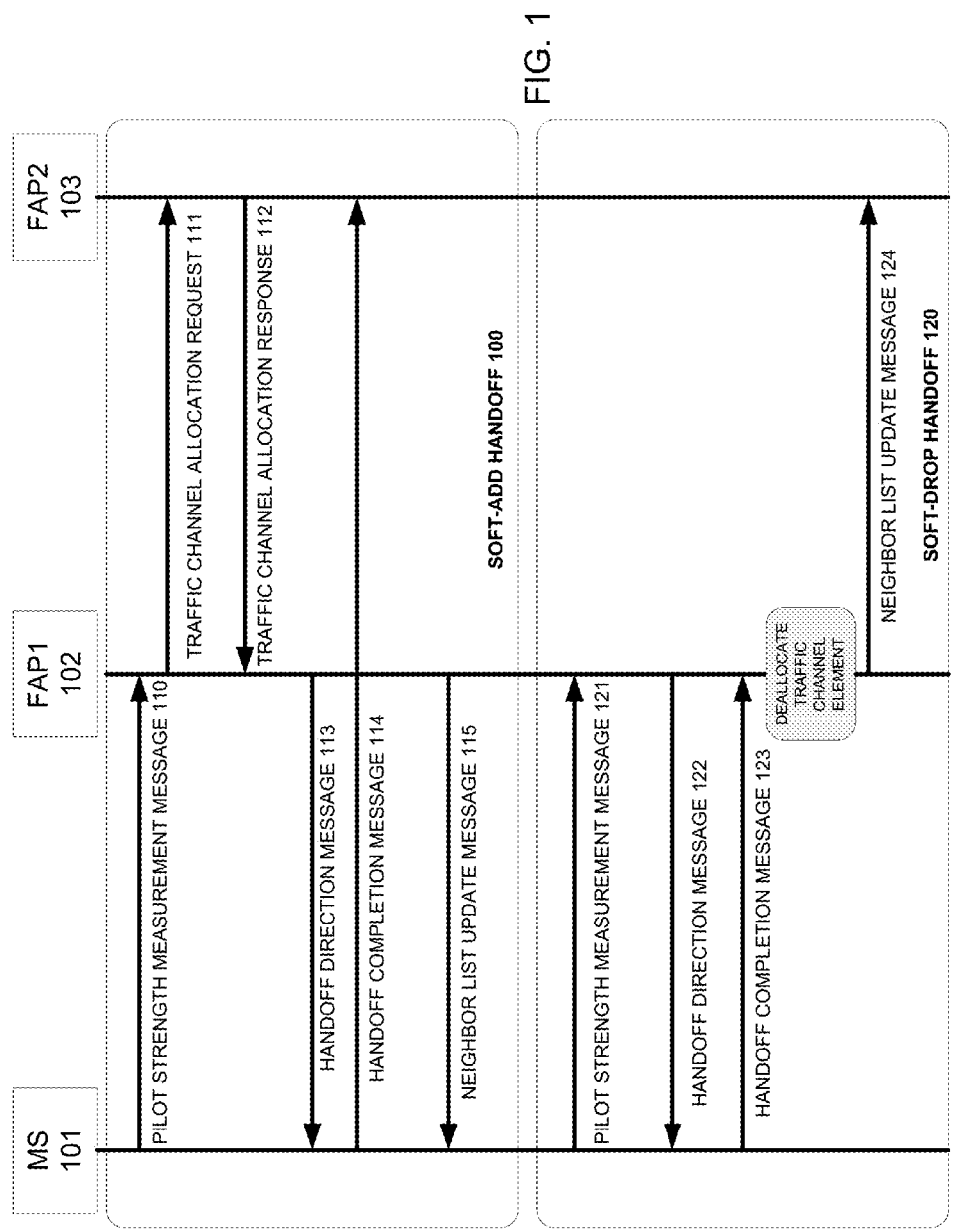
FIG. 1 illustrates an example network signaling chart for a soft-add handoff and soft-drop handoff procedure, according to example embodiments of the present invention.

FIG. 1 illustrates an example communication flow of data signaling, according to example embodiments of the present invention. Referring to FIG. 1, a mobile station (MS) 101 is in communication with one or more femtocell access points (FAPs). A FAP cluster is defined as two or more FAPs supporting soft handoff capabilities using the local network connection. In order to provide data authentication, integrity, and confidentiality, signaling and traffic packets at a FAP would come through an IPSec tunnel and security gateway (not shown). However, the frequent soft handoffs may cause network overhead and packet delay. Creating a femtocell cluster in a secure internal or dedicated network, the FAPs operating in the cluster may communicate directly may provide not communicating via IPSec. This may reduce the amount of overhead created in the cluster.

FIG. 1 illustrates a MS 101 communicating with FAP1 and FAP2 in a femtocell cluster configuration to perform a soft-add handoff 100. The soft-add handoff may be used to add the MS 101 to the femtocell network. A pilot strength measurement message 110 may be transmitted from the MS 101 to the FAP1 102, which determines that the FAP2 103 pilot signal is strong enough to enter an active set. A traffic channel allocation request 111 may be sent from the FAP1 102 to the FAP2 103, which responds with a traffic channel allocation response 112. A handoff direction message 113 may be sent from the FAP1 to the MS 101 indicating that the FAP2 pilot is now an active set as well as the FAP1 pilot. A handoff completion message 114 may be communicated from the MS 101 to the FAP1 and the FAP2. A neighbor list update message 116 may be sent to all nodes in the network to update a table of nodes currently available in the cluster network. The update may reflect that the MS 101 as added to the network.

A soft-drop handoff 120 is also illustrated in FIG. 1. This procedure may be performed by the MS 101 transmitting a pilot strength measurement message 121 to the FAP 1 and/or the FAP2. In response, a message, indicating that the FAP1 pilot is weak enough to enter the neighbor set may be returned indicating that a soft-drop should be performed. A handoff direction message 122 may be sent back to the MS 101 indicating that only the FAP2 pilot is the active set. A handoff completion message 123 may be transmitted from the MS 101 to the FAP1 and/or the FAP2 along with confirmations responses from one or more of the network elements. A de-allocation of the FAP1 traffic channel element may be performed and a neighbor list update message 124 may be transferred to the other network elements to reflect the changes. This procedure may move the MS 101 from one FAP to another FAP, or, to drop the MS 101 from the network communications altogether.

A FAP as illustrated in the various figures of the present application, may have a regular neighbor cell list in which cells interface via an IPSec tunnel, as well as a cluster neighbor cell list in which cells interface directly. Cluster neighbor cells should be managed separately from the regular neighbor cells since the clustering is an add-on feature. However, the overhead or in-traffic neighbor list messages to MSs should include the regular neighbor cells as well as the cluster neighbor cells since MSs do not need to know whether a cell is included in the regular neighbor list or cluster neighbor list.

When a MS sends a pilot strength measurement message (PSMM) to the FAP, the FAP will check the regular neighbor list first to find a mapping cell for the pseudo-noise (PN) in the PSMM message, and for any cells that are not found, then a check may be performed to check the cluster neighbor list. If a mapped cell is found in the cluster neighbor list, the base station (BS) sends the traffic channel element allocation request message to the target cell directly using local IP addresses obtained from the cluster neighbor list.

When the target cell receives the traffic channel element allocation request message, it may store the serving IP address, allocate the necessary resources, and respond to the message with the results and the resource information. If the result is successful, the serving FAP may process the remaining handoff procedure via the local network. If the FAP receives the handoff complete message from the MS, it will communicate with the MS via the traffic channel at the serving FAP as well as at the target FAP using the local network.

As described in detail below, various network configurations and operating procedures are described with reference to FIGS. 2-11. These example network configurations and related procedures are not intended to be exhaustive and represent some of the basic communication signaling and response procedures commonly associated with femtocell cluster network communications.

Figure 2:
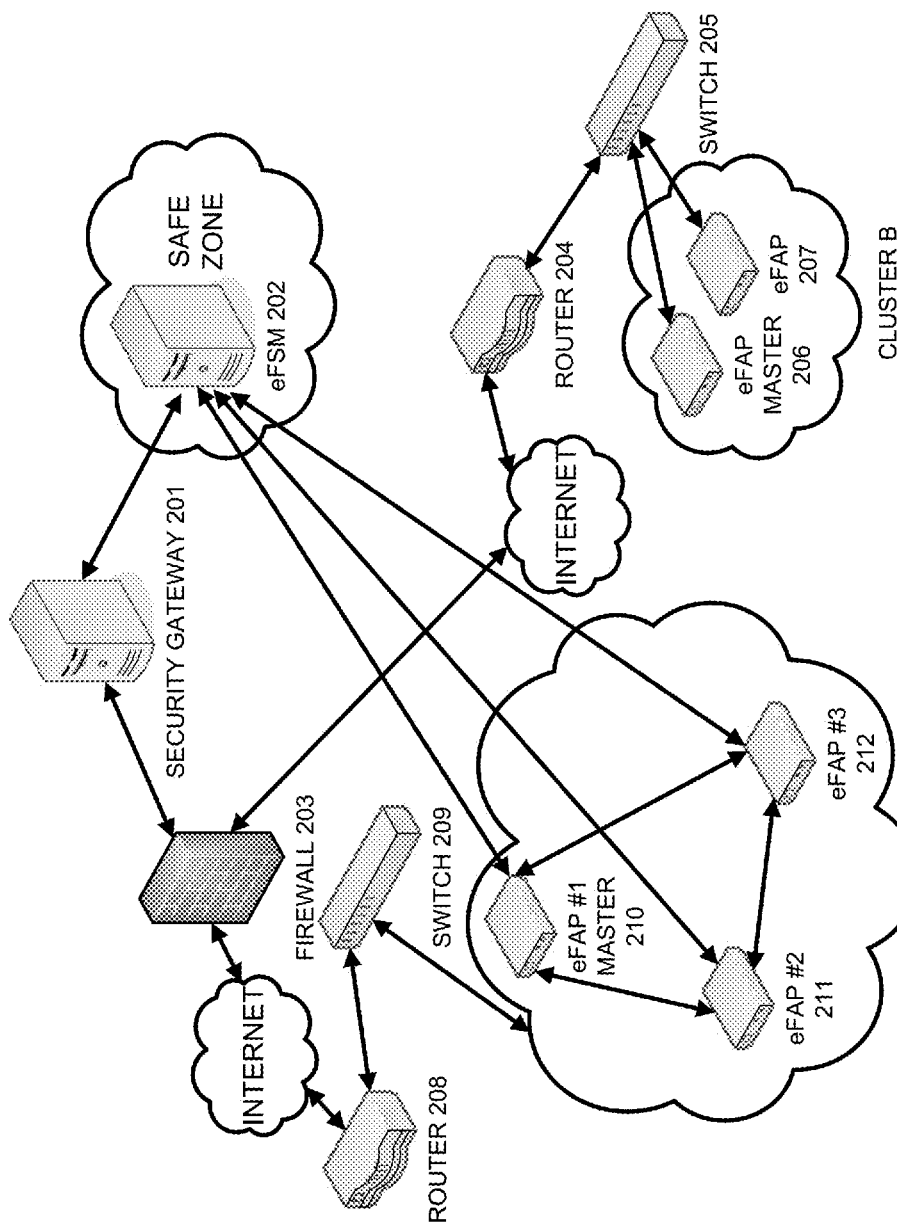
FIG. 2 illustrates an example network configuration of cluster creation among a plurality of network devices, according to example embodiments of the present invention.

FIG. 2 illustrates an example cluster creation network configuration, according to example embodiments of the present invention. Referring to FIG. 2, various network elements are included in a communication network often associated with a cluster group. A security gateway 201 provides access to a femtocell station modem (eFSM 202) or configuration server which communicates with each of the eFAPs 210, 211 and 212 of the cluster group A. Access to the cluster group A may also be provided through a firewall 203 which connects over the Internet to a router 208 and switch 209. Another cluster B is illustrated for example purposes which includes its own eFAP master 206 and eFAP 207. Access to cluster B may also be provided through a router 204 and switch 205.

In operation, cluster creation may be performed by sending an eFAP master selection message from eFSM 202 to eFAP #1 master 210 by configuring eFAP 210 to have IP address 192.xxx.xxx.100, cluster ID=cluster group A (CGA), and setting the IPsec-IP to 128.xxx.xxx.xxx. A message may be sent from eFSM 202 to eFAP #2 211 to set the master IP address to 192.xxx.xxx.100, cluster ID=cluster group A (CGA), and setting the IPsec-IP to 129.xxx.xxx.xxx, and, similarly, a message may be sent to eFAP #3 212 to set the master IP address to 192.xxx.xxx.100, cluster ID=cluster group A (CGA), and setting the IPsec-IP to 130.xxx.xxx.xxx. The IP addresses of eFAP #1, #2 and #3 may be, for example, 192.xxx.xxx.100, 192.xxx.xxx.101 and 192.xxx.xxx.102, respectively.

Once the eFAPs are setup through the eFSM 202, eFAP #2 may register with the master eFAP #1 and receive a neighbor list based on a cluster master/slave table maintained by the eFAP #1 master. Similarly, eFAP #3 may register with the master eFAP #1 and receive a neighbor list with three entries, representing eFAPs #1-#3. A synchronization update may be performed between one or more of the eFAPS #1-#3 to reflect any updates made to the latest cluster table and its respective entries.

Figure 3:
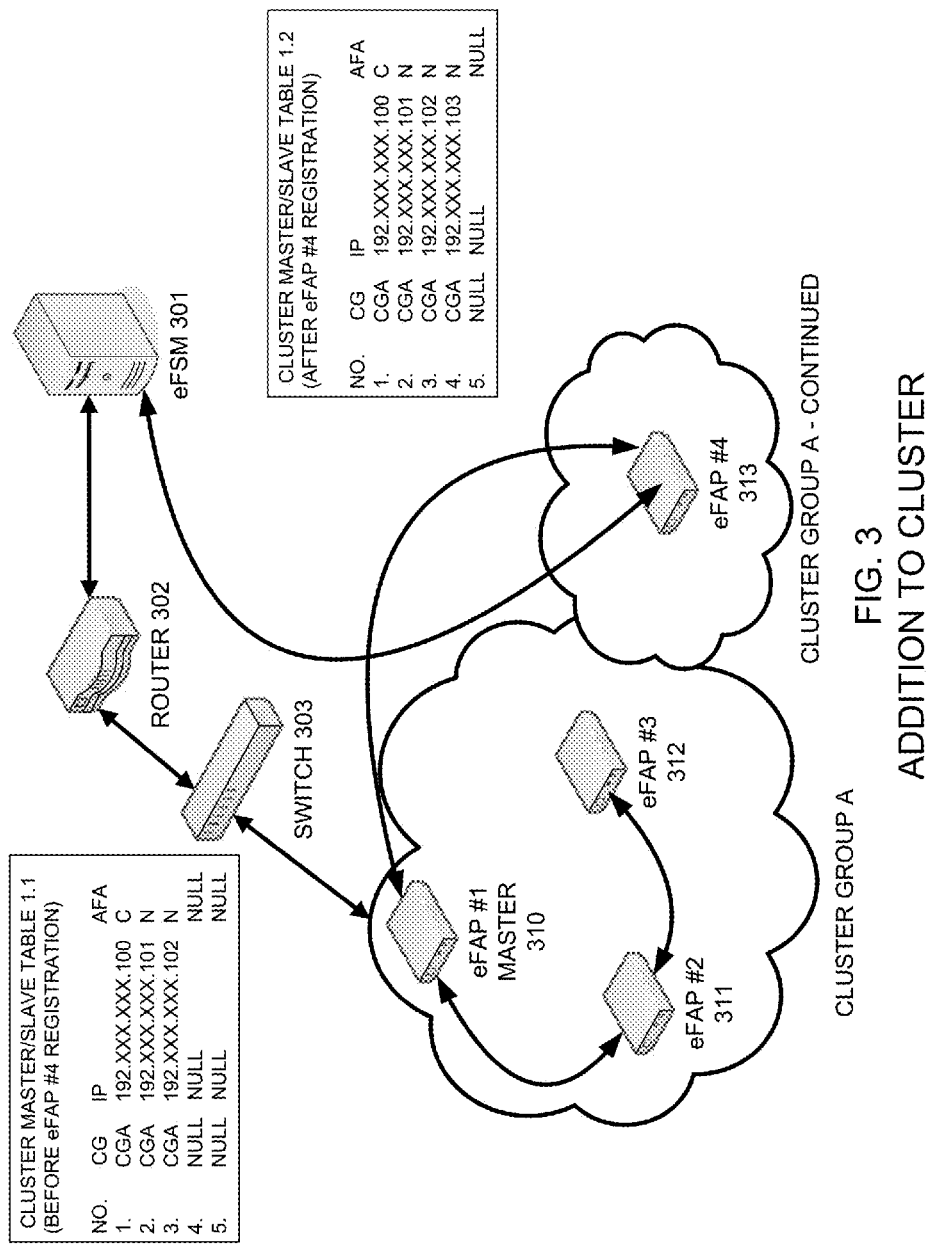
FIG. 3 illustrates an example network configuration of adding network elements to an existing cluster, according to example embodiments of the present invention.

FIG. 3 illustrates an example cluster network configuration that includes adding a new eFAP, according to example embodiments of the present invention. Referring to FIG. 3, various network elements are included in a communication network often associated with a cluster group. An eFSM 301, a router 302, a switch 303 and eFAPs 310-313 may be part of the cluster group. As noted above with respect to cluster group A, a master eFAP #1 310, and slave eFAPs 311 and 312 are established as CGA. In this example, a new eFAP #4, 313 may be added to the CGA.

In order to add a new eFAP #4, the eFSM 301 informs the eFAP #4 about the master IP (local IP) address 192.xxx.xxx.100 and the cluster group A (CGA). The eFAP #4 then initiates contact with the eFAP #1 master 310 by transmitting a register message to the eFAP #1 master 310, which responds to eFAP #4 313 by updating the present table and transmitting a neighbor list table to eFAP #4 313 identifying eFAP #4 313 as the fourth eFAP in the table. Generally, the master and slave tables are the same. A synchronization message may be sent between the eFAP #1 master and eFAP #2 and #3 slaves. The message may be sent by transmitting the message from the eFAP master #1 to the eFAP #2 and eFAP #3, or, the message may be transferred from the eFAP #1 to eFAP #2, which forwards the table from eFAP #2 onto eFAP #3. Table 1.1 illustrates the cluster master/slave table prior to registering eFAP #4 and Table 1.2 illustrates the cluster master/slave table after eFAP #4 registration.

Figure 4:
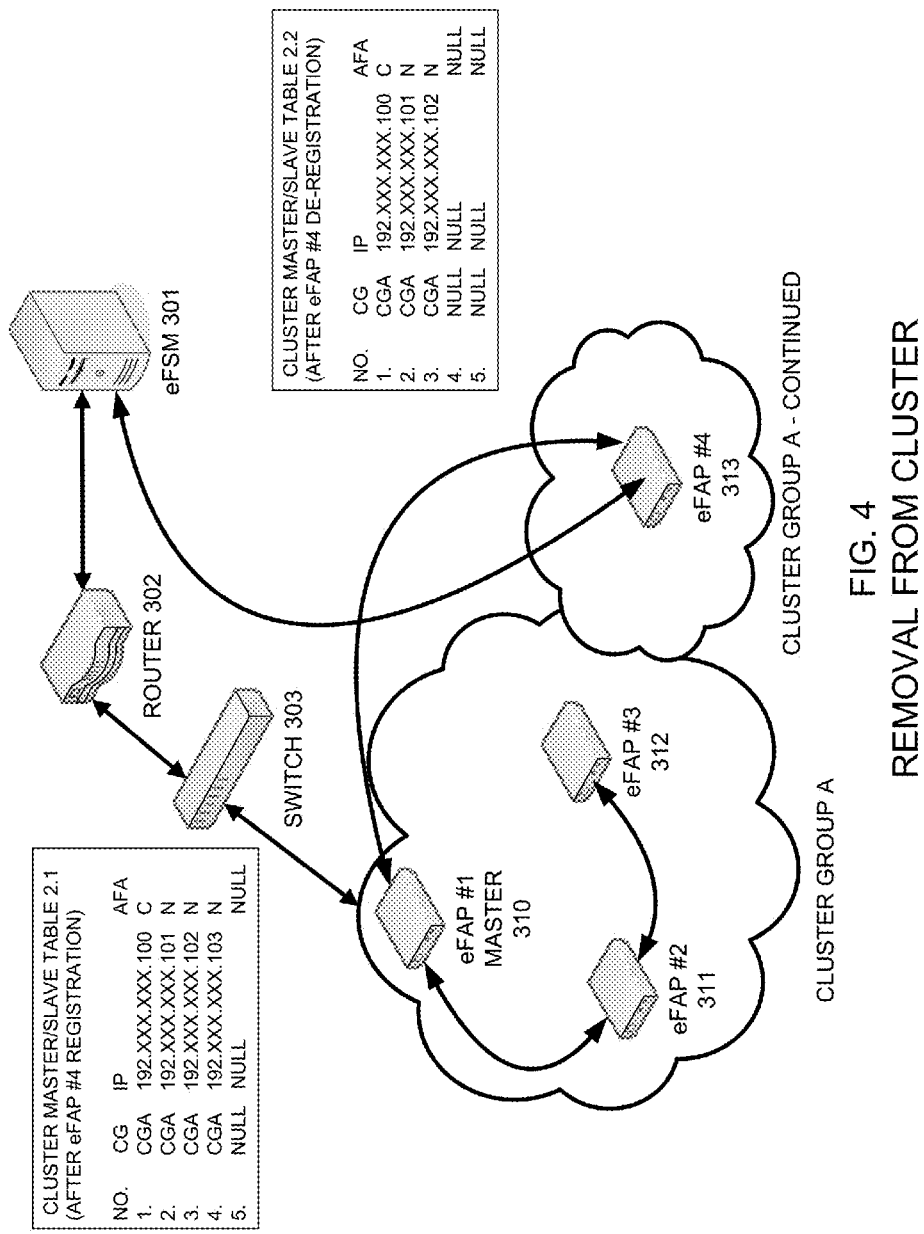
FIG. 4 illustrates an example network configuration of removing network elements from an existing cluster, according to example embodiments of the present invention.

FIG. 4 illustrates an example cluster network configuration that includes removing an eFAP, according to example embodiments of the present invention. Referring to FIG. 4, various network elements are included in a communication network often associated with a cluster group. An eFSM 301, a router 302, a switch 303 and eFAPs 310-313 may be part of the cluster group. As noted above with respect to cluster group A, a master eFAP #1 310, and slave eFAPs 311, 312 and 313 are established as CGA. In this example, an eFAP #4 313 will be removed from the CGA.

During the removal procedure, the eFSM 301 informs eFAP #4 that the master IP is 0.0.0.0 (an empty string) and the cluster group is CG0 (group none). The eFAP #4 313 transmits an un-register message to eFAP #1 master 310, which performs a table update and a synchronization message is transmitted to the other eFAPs #2 and #3. Tables 2.1 and 2.2 reflect the before and after result of cluster master/slave table being updated to reflect the removal of eFAP #4.

Figure 5:
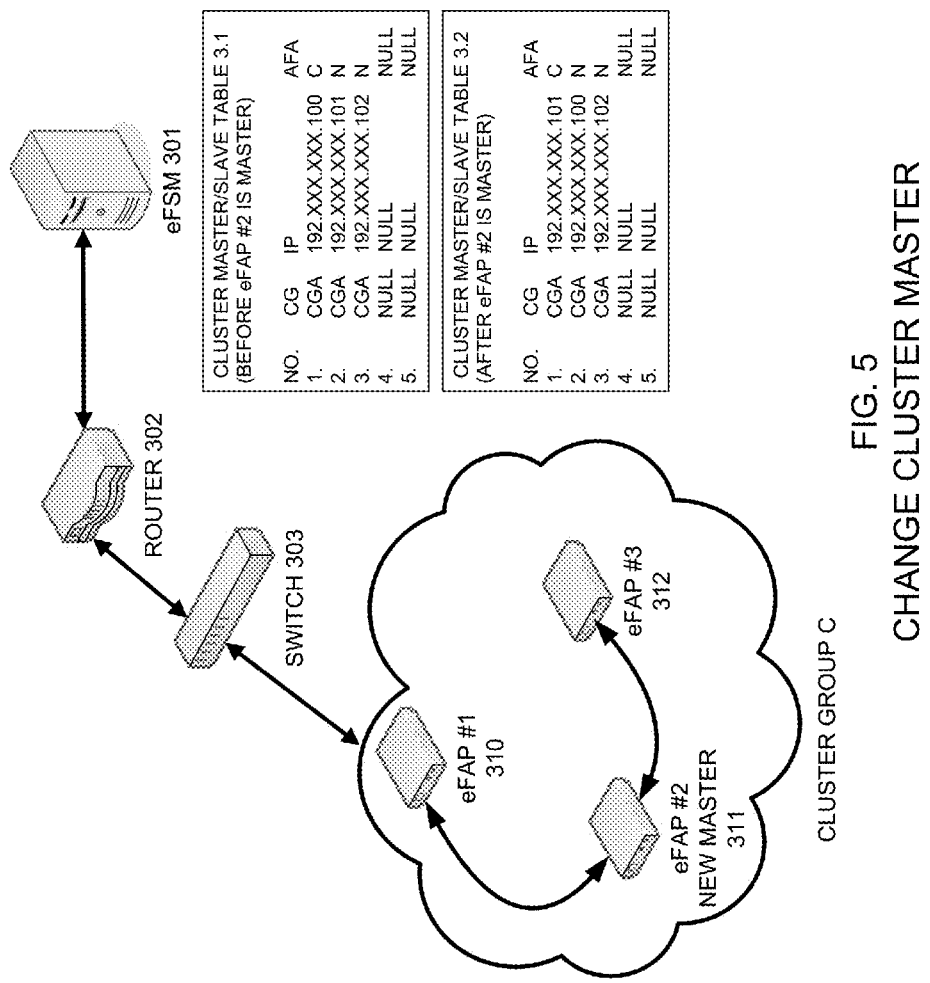
FIG. 5 illustrates an example network configuration of switching a cluster master, according to example embodiments of the present invention.

FIG. 5 illustrates an example cluster network configuration that includes changing the cluster master, according to example embodiments of the present invention. Referring to FIG. 5, various network elements are included in a communication network often associated with the cluster group. An eFSM 301, a router 302, a switch 303 and eFAPs 310-312 may be part of the cluster group. As noted above with respect to cluster group A, a master eFAP #1 310, and slave eFAPs 311 and 312 are established as part of CGA. In this example, eFAP #1 310 will be demoted as the former master and the eFAP #2 311 will become the new master.

In operation, the eFSM 301 sets eFAP #2 as the new master and sends the cluster group IP cluster group C (CGC) and IPsec 140.xxx.xxx.xxx to the new master eFSM #2 311. the eFSM 301 sends a message to eFAP #1 310 that the IP address of the master is now 192.xxx.xxx.101 and the cluster ID is CGC. eFAP #1 switches to slave mode and resets the table. Registration with the new master eFAP #2 is performed by both eFAP #1 and eFAP #3 and updated tables are sent to eFAP #1 and eFAP #3 from master eFAP #2. Periodic synchronization messages are sent from master eFAP #2 to each of the slaves eFAP #1 and eFAP #3. Tables 3.1 and 3.2 illustrate the changes made to reflect the change in the master eFAP.

Figure 6:
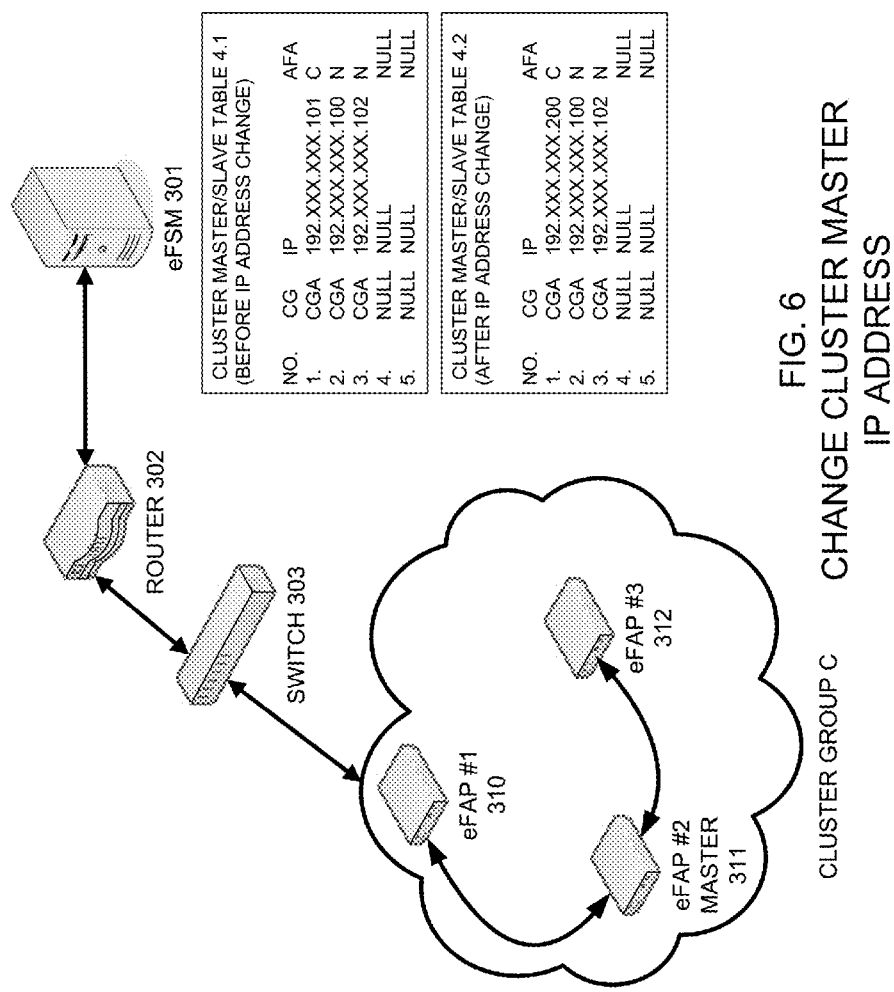
FIG. 6 illustrates an example network configuration of changing a cluster master network address, according to example embodiments of the present invention.

FIG. 6 illustrates an example cluster network configuration that includes changing the cluster master's IP address, according to example embodiments of the present invention. Referring to FIG. 6, various network elements are included in a communication network often associated with a cluster group. An eFSM 301, a router 302, a switch 303 and eFAPs 310-312 may be part of the cluster group. As noted above with respect to cluster group C, a master eFAP #2 310, and slave eFAPs 310 and 312 are established as part of CGC. In this example, eFAP master #2 311 will have its IP address of 192.xxx.xxx.101 changed to 192.xxx.xxx.200.

In operation, master eFAP #2 sends an IP address change notification to the eFSM 301, which informs the other eFAPS #1 and #3 that the new master IP address of eFAP #2 is 192.xxx.xxx.200 and the cluster ID is CGC. Each of the eFAPs will reset the current cluster table information in their locally stored cluster tables. The eFAP #1 will register with the master eFAP #2, which will update the new table to reflect the IP address change and send the new table back to eFAP #1. Similarly, eFAP #3 will register and receive an updated table from master eFAP #2. Periodically, master eFAP #2 will perform a synchronization that sends the updated cluster table to the other eFAPs #1 and/or #3. Table 4.1 illustrates the IP addresses before the change and Table 4.2 illustrates the tables after the change.

Figure 7:
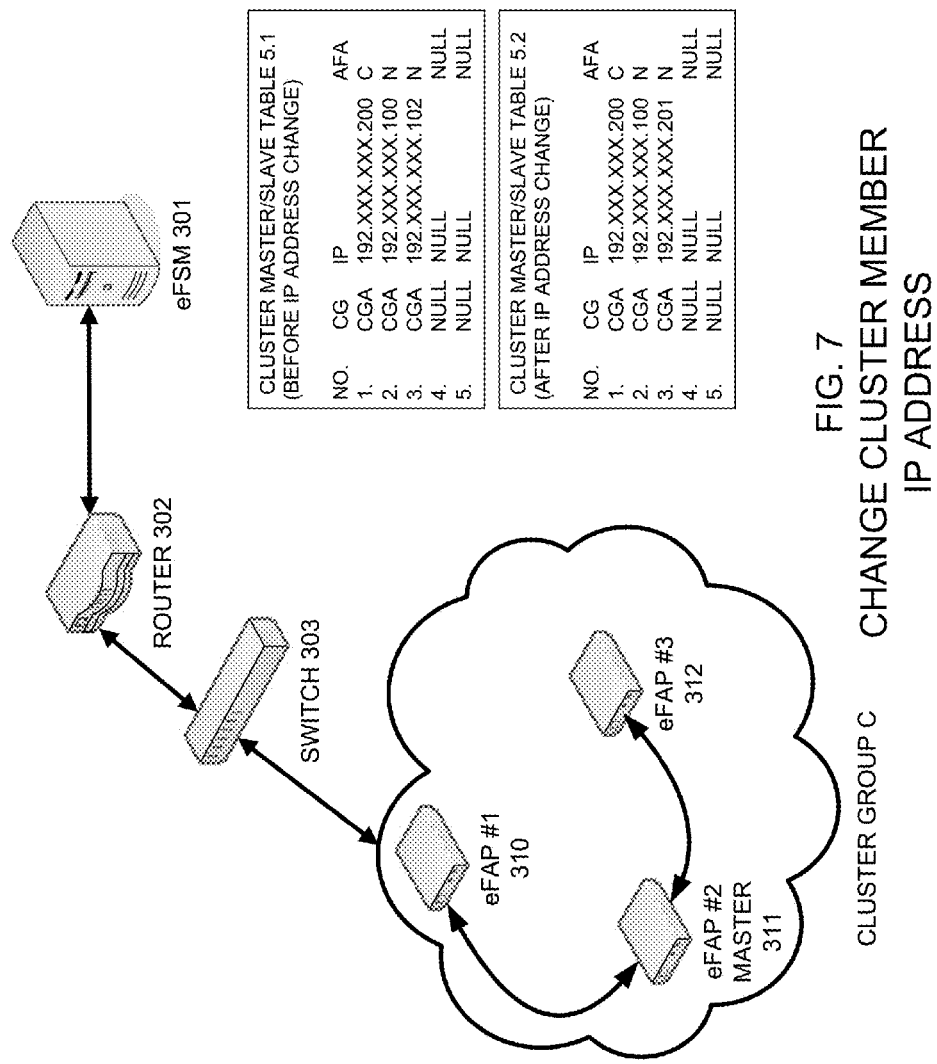
FIG. 7 illustrates an example network configuration of changing a cluster member network address, according to example embodiments of the present invention.

FIG. 7 illustrates an example cluster network configuration that includes changing a cluster member's IP address, according to example embodiments of the present invention. Referring to FIG. 7, various network elements are included in a communication network often associated with a cluster group. An eFSM 301, a router 302, a switch 303 and eFAPs 310-312 may be part of the cluster group. As noted above with respect to cluster group C, a master eFAP #2 311, and slave eFAPs 310 and 312 are established as part of the CGC. In this example, eFAP #3 312 will have its IP address of 192.xxx.xxx.102 changed to 192.xxx.xxx.201.

In operation, eFAP #3 sends an IP address change notification to the eFSM 301 and the eFAP master #2, which updates the table to reflect that the new IP address of eFAP #3 is 192.xxx.xxx.201. Each of the eFAPs will reset the current cluster table information in their locally stored cluster tables. The master eFAP #2 will send the updated cluster table to the eFAP #3. Periodically, master eFAP #2 will perform a synchronization that sends the updated cluster table to the other eFAPs #1 and/or #3. Table 5.1 illustrates the IP addresses before the change and Table 5.2 illustrates the table after the change.

Figure 8:
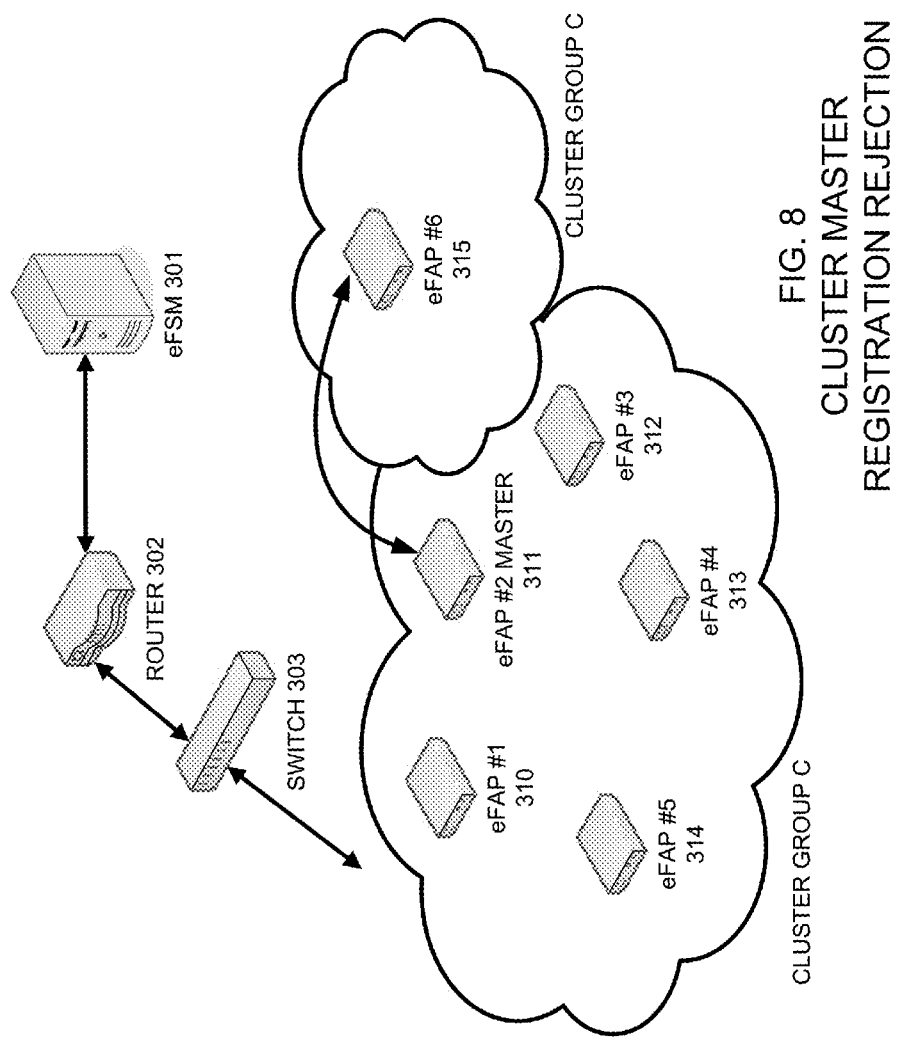
FIG. 8 illustrates an example network configuration of rejecting a cluster registration request, according to example embodiments of the present invention.

FIG. 8 illustrates an example cluster network configuration that includes a master eFAP rejecting a new eFAP registration, according to example embodiments of the present invention. Referring to FIG. 8, various network elements are included in a communication network often associated with a cluster group. An eFSM 301, a router 302, a switch 303 and eFAPs 310-312 may be part of the cluster group. In this example for cluster group C, a master eFAP #2 311, and slave eFAPs 310 and 312-314 are established as part of the CGC. In this example, eFAP #6 315 will have its registration request denied.

In operation, eFAP #6 315 attempts to register to eFAP master #2 311 by sending a register message to eFAP master #2. Prior to registration, the eFSM 301 may send an eFAP master IP address to eFAP #6. The eFAP master #2 may perform a lookup operation to determine if an available entry is present in the table. If the table is full, the eFAP master #2 may send a deny registration message to the eFAP #6 315. This may cause the rejected eFAP #6 to raise an alarm indicating that the registration is unsuccessful, which may cause a periodic re-registration procedure to be initiated until a successful registration is completed.

Figure 9:
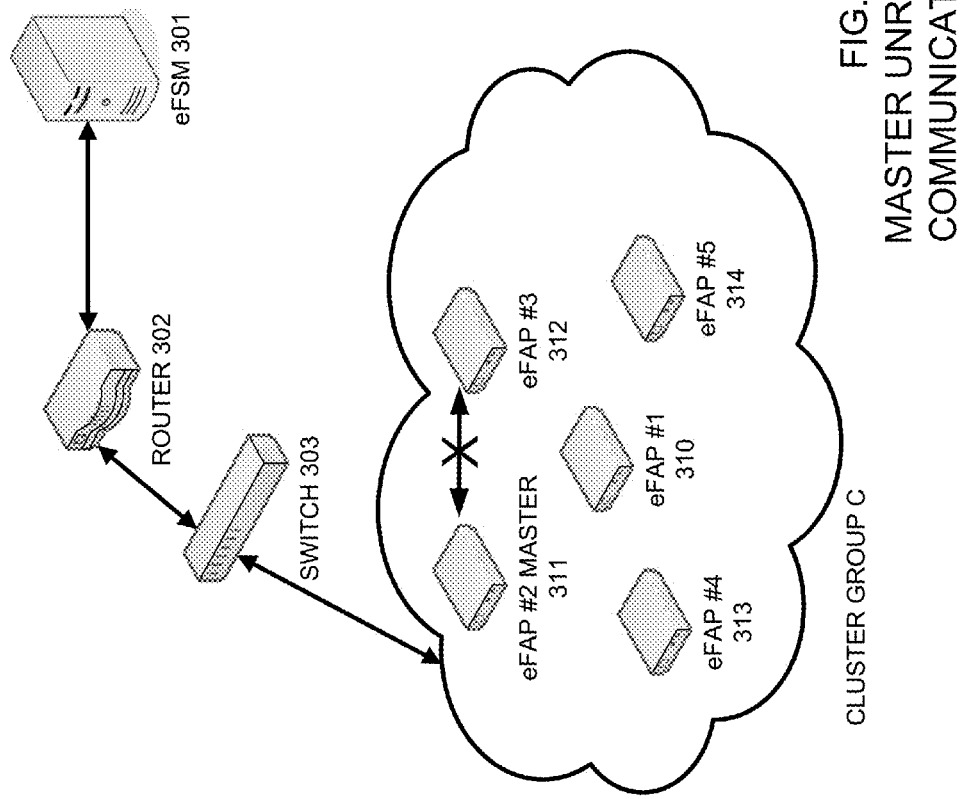
FIG. 9 illustrates an example network configuration of handling an unreachable cluster master, according to example embodiments of the present invention.

FIG. 9 illustrates an example cluster network configuration that includes a failed attempt to reach the master eFAP, according to example embodiments of the present invention. Referring to FIG. 9, various network elements are included in a communication network often associated with a cluster group. An eFSM 301, a router 302, a switch 303 and eFAPs 310-314 are illustrated as part of the cluster group. In this example for cluster group C, a master eFAP #2 311, and slave eFAPs 310 and 312-314 are established as part of the CGC. In this example, eFAP #3 312 will fail to establish communication with master eFAP #2.

In operation, eFAP #3 312 attempts to communicated with master eFAP #2 311 by sending a message to eFAP master #2. The eFAP master #2 may be unreachable and may fail to respond to the message sent from eFAP #3. This may cause the eFAP #3 to raise an alarm indicating that the master eFAP #3 is unreachable, which may cause a broadcast message to be sent to all eFAPs to raise an alarm until communication is re-established between any of the eFAP slaves and the master eFAP.

Figure 10:
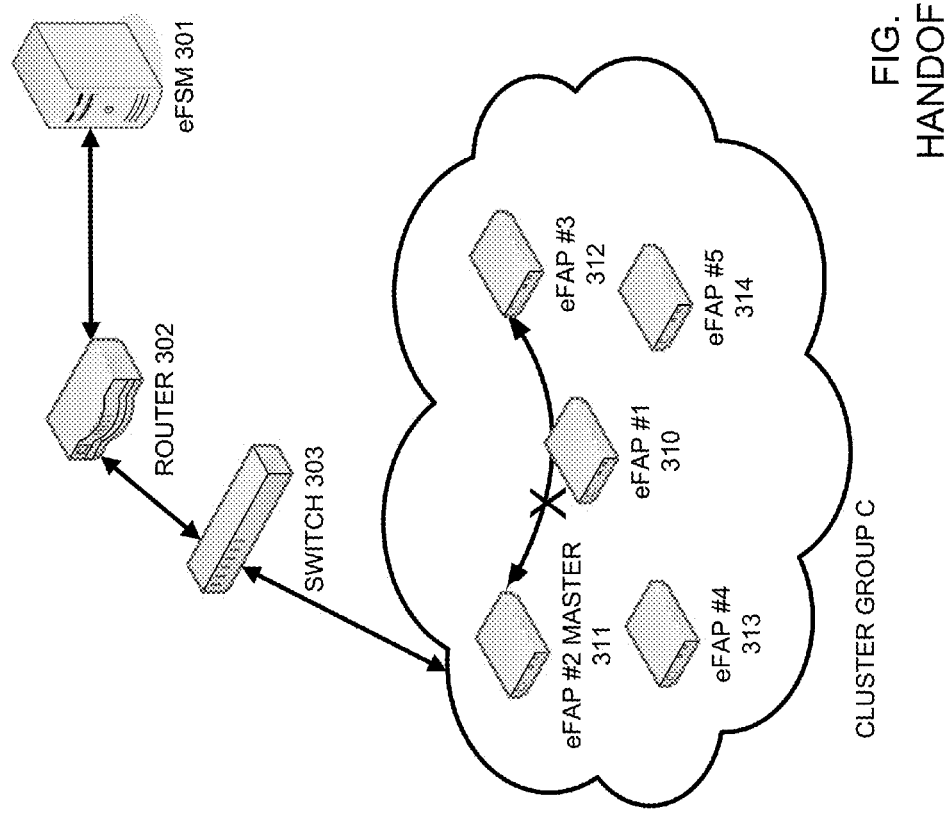
FIG. 10 illustrates an example network configuration of a handoff failure, according to example embodiments of the present invention.

FIG. 10 illustrates an example cluster network configuration that includes a failed attempt to handoff an eFAP, according to example embodiments of the present invention. Referring to FIG. 10, various network elements are included in a communication network often associated with a cluster group. An eFSM 301, a router 302, a switch 303 and eFAPs 310-314 are illustrated as part of the cluster group. In this example for cluster group C, a master eFAP #2 311, and slave eFAPs 310 and 312-314 are established as part of the CGC. In this example, eFAP #3 312 will handoff to eFAP #1, however, eFAP #1 will fail to handoff to master eFAP #2 311.

In operation, eFAP #3 312 attempts to handoff the eFAP #1 and is successful. However, in attempting to handoff from eFAP #1 to the master eFAP #2 311 a failure occurs. The eFAP #1 will then create a handoff failure alarm, which may cause handoff re-attempts to periodically occur until the handoff to the master eFAP #1 is successful. When the handoff does occur, the alarm may be terminated.

Figure 11:
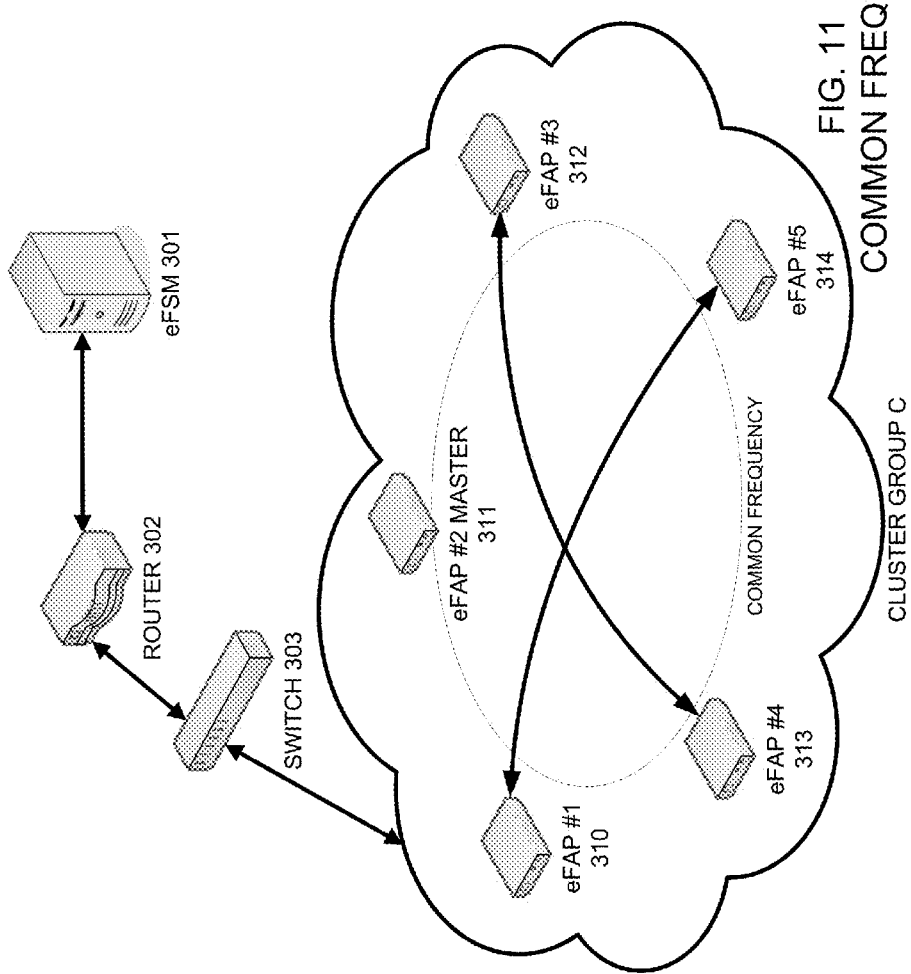
FIG. 11 illustrates an example network configuration of managing configuration settings by a cluster master, according to example embodiments of the present invention.

FIG. 11 illustrates an example cluster network configuration that includes the master eFAP controlling the configurations of each of the eFAPs, according to example embodiments of the present invention. Referring to FIG. 11, various network elements are included in a communication network often associated with a cluster group. An eFSM 301, a router 302, a switch 303 and eFAPs 310-314 are illustrated as part of the cluster group. In this example for cluster group C, a master eFAP #2 311, and slave eFAPs 310 and 312-314 are established as CGC. In this example, eFAP master #2 311 controls the configurations of each of the slave eFAPs 310 and 312-314.

In operation, master eFAP #2 312 will establish a PN value, such as, PN=40 and a operational frequency, such as, 1025 for a first eFAP #1 310. Other eFAPs #3, #4, #5, may be setup to operate at PN values of 44, 48, 52. This offset of "4" may provide optimal communication signaling depending on the environment and size of the femtocell. The master eFAP #2 311 may receive signals transmitted from the slave eFAPs and determine if the PN values or frequency should be modified based on the received signal quality of signals received (i.e., SNR, power levels, etc.).

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 13 illustrates an example network element 1300, which may represent any of the above-described network components 101, 102, 103, 201-212, 301-303 and 310-315.

Figure 13:
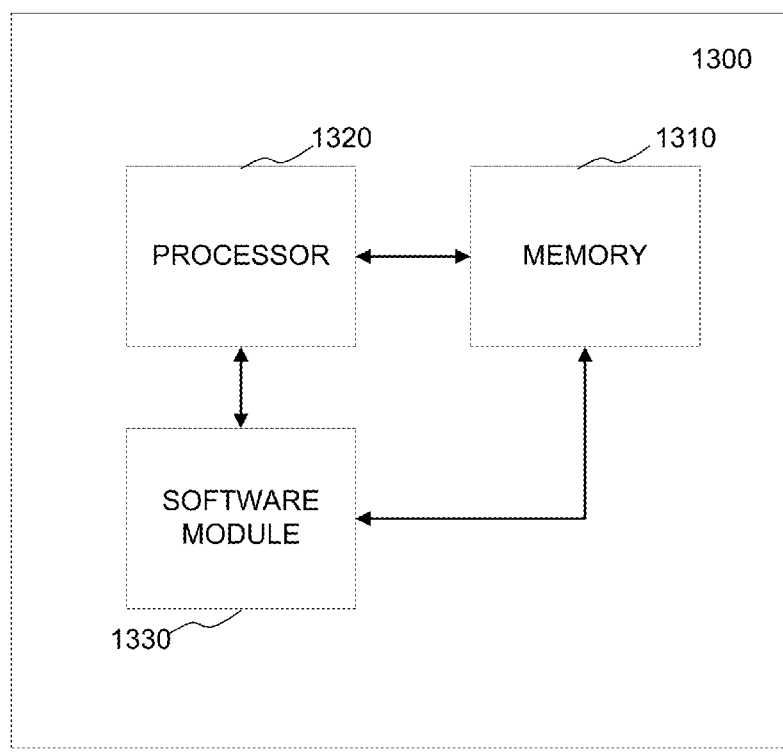
FIG. 13 illustrates an example network entity, receiver and/or transmitter configured to store software instructions and perform example operations disclosed throughout the specification.

As illustrated in FIG. 13, a memory 1310 and a processor 1320 may be discrete components of the network entity 1300 that are used to execute an application or set of operations. The application may be coded in software in a computer language understood by the processor 1320, and stored in a computer readable medium, such as, the memory 1310. The computer readable medium may be a non-transitory computer readable medium that includes tangible hardware components in addition to software stored in memory. Furthermore, a software module 1330 may be another discrete entity that is part of the network entity 1300, and which contains software instructions that may be executed by the processor 1320. In addition to the above noted components of the network entity 1300, the network entity 1300 may also have a transmitter and receiver pair configured to receive and transmit communication signals (not shown).

Figure 12:
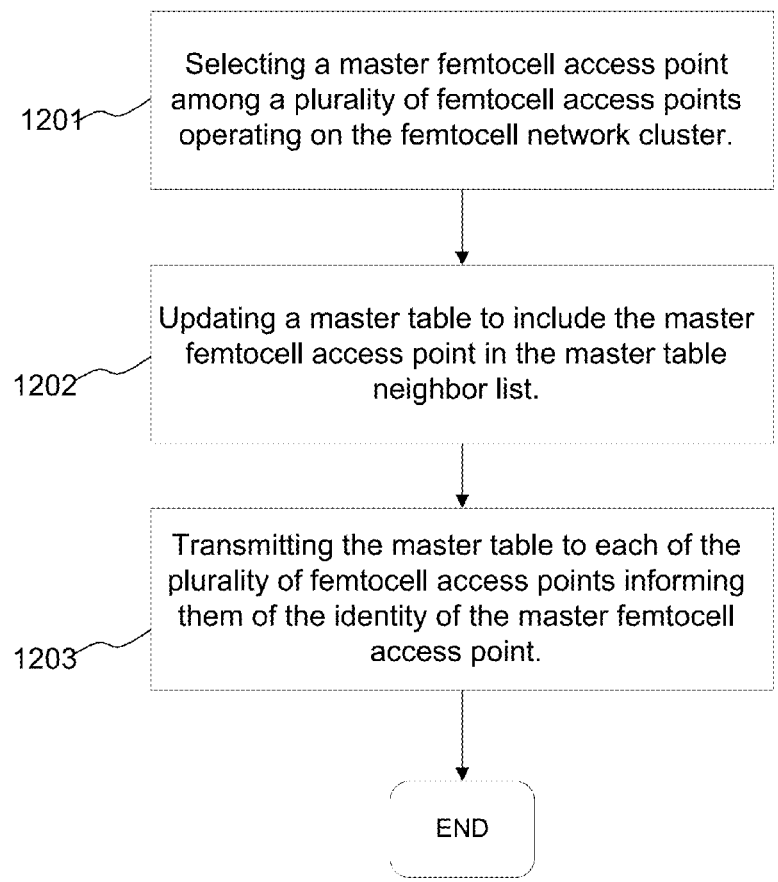
FIG. 12 illustrates an example flow diagram of a method according to example embodiments of the present invention.

One example method of the present invention may include a method of operating a femtocell network cluster, as illustrated in FIG. 12. The method may include selecting a master femtocell access point among a plurality of femtocell access points operating on the femtocell network cluster, at operation 1201. The method may also include updating a master table to include the master femtocell access point in the master table neighbor list, at operation 1202. The method may further include transmitting the master table to each of the plurality of femtocell access points informing them of the identity of the master femtocell access point, at operation 1203.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    selecting a master femtocell access point among a plurality of femtocell access points operating on a femtocell network cluster;
    transmitting a master table from the master femtocell access point to each of the plurality of femtocell access points informing them of the identity of the master femtocell access point;
    identifying a new femtocell access point unidentified by the master table;
    transmitting an IP address identifying the master femtocell access point and a cluster identifier to the new femtocell access point;
    adding the new femtocell access point to the master table to create an updated master table; and
    communicating the updated master table by the master femtocell access point to the plurality of femtocell access points.

2. The method of claim 1, wherein the selecting the master femtocell access point comprises setting the IP address of the master femtocell access point and creating the cluster identifier for the femtocell network cluster.

3. The method of claim 2, wherein transmitting the master table to each of the plurality of femtocell access points informing them of the identity of the master femtocell access point comprises transmitting the IP address of the master femtocell access point and the cluster identifier of the femtocell network cluster.

4. The method of claim 1, further comprising periodically transmitting a synchronization update message to each of the plurality of femtocell access points including a copy of the master table indicating whether any changes in the femtocell network cluster have occurred.

5. The method of claim 4, wherein the changes in the femtocell network cluster comprise any additions or deletions to the plurality of femtocell access points operating in the femtocell network cluster.

6. The method of claim 1, further comprising maintaining the master table by the master femtocell access point.

7. The method of claim 1, further comprising updating the master table to include the master femtocell access point in a neighbor list of the master table.

8. An apparatus, comprising:
    a processor configured to select a master femtocell access point among a plurality of femtocell access points operating on a femtocell network cluster; and
    a transmitter configured to transmit a master table to each of the plurality of femtocell access points informing them of the identity of the master femtocell access point;
    wherein the master femtocell access point communicates the updated master table to the plurality of femtocell access points;
    wherein a new femtocell access point is unidentified by the master table;
    wherein the transmitter is further configured to transmit an IP address identifying the master femtocell access point and a cluster identifier to the new femtocell access point; and
    wherein the new femtocell access point is added to the master table to create an updated master table.

9. The apparatus of claim 8, wherein during the selection of the master femtocell access point the processor is further configured to set the IP address of the master femtocell access point and a cluster identifier for the femtocell network cluster and store the values in a memory.

10. The apparatus of claim 9, wherein the transmitter transmits the master table to each of the plurality of femtocell access points to inform them of the identity of the master femtocell access point and is further configured to transmit the IP address of the master femtocell access point and the cluster identifier of the femtocell network cluster.

11. The apparatus of claim 8, wherein the transmitter is further configured to periodically transmit a synchronization update message to each of the plurality of femtocell access points including a copy of the master table indicating whether any changes in the femtocell network cluster have occurred.

12. The apparatus of claim 11, wherein the changes in the femtocell network cluster comprise any additions or deletions to the plurality of femtocell access points operating in the femtocell network cluster.

13. The apparatus of claim 8, wherein the master femtocell access point maintains the master table.

14. The apparatus of claim 8, wherein the master table is updated to include the master femtocell access point in a neighbor list of the master table.

15. A non-transitory computer readable storage medium configured to store instructions that when executed by a processor, cause the processor to perform:
    selecting a master femtocell access point among a plurality of femtocell access points operating on a femtocell network cluster;
    transmitting the master table to each of the plurality of femtocell access points informing them of the identity of the master femtocell access point;
    identifying a new femtocell access point unidentified by a master table;
    transmitting an IP address identifying the master femtocell access point and a cluster identifier to the new femtocell access point;
    adding the new femtocell access point to the master table to create an updated master table; and
    communicating the updates of the master table to the plurality of femtocell access points.

16. The non-transitory computer readable storage medium of claim 15, wherein the selecting the master femtocell access point comprises setting the IP address of the master femtocell access point and creating a cluster identifier for the femtocell network cluster.

17. The non-transitory computer readable storage medium of claim 16, wherein transmitting the master table to each of the plurality of femtocell access points informing them of the identity of the master femtocell access point comprises transmitting the IP address of the master femtocell access point and the cluster identifier of the femtocell network cluster.

18. The non-transitory computer readable storage medium of claim 15, further comprising periodically transmitting a synchronization update message to each of the plurality of femtocell access points including a copy of the master table indicating whether any changes in the femtocell network cluster have occurred.

19. The non-transitory computer readable storage medium of claim 18, wherein the changes in the femtocell network cluster comprise any additions or deletions to the plurality of femtocell access points operating in the femtocell network cluster.

20. The non-transitory computer readable storage medium of claim 15, further comprising maintaining the master table by the master femtocell access point.

\* \* \* \* \*